United States Patent [19]

Derrick et al.

[11] 4,231,141
[45] Nov. 4, 1980

[54] ATTACHMENT DEVICE FOR FLEXIBLE FILMS AND FABRICS

[76] Inventors: Danny O. Derrick, 5935 McMillan Cir., Columbia, S.C. 29210; Donald F. Looney, P.O. Box 685, Irmo, S.C. 29063

[21] Appl. No.: 928,180

[22] Filed: Jul. 26, 1978

[51] Int. Cl.² ............................................. A44B 21/00
[52] U.S. Cl. ................................. 24/243 K; 160/395
[58] Field of Search ............ 24/243 K; 160/395, 392

[56] References Cited

U.S. PATENT DOCUMENTS

| | | | |
|---|---|---|---|
| 1,484,382 | 2/1924 | Allitt | 160/392 |
| 1,758,720 | 5/1930 | Sodergren | 160/392 |
| 2,287,667 | 6/1942 | Brown | 160/392 |
| 3,064,724 | 11/1962 | Nowell | 160/392 |
| 3,090,646 | 5/1963 | Johnson | 160/392 |
| 3,426,412 | 2/1969 | Streng | 24/243 K |
| 3,848,380 | 11/1974 | Assael | 160/395 |
| 3,961,661 | 6/1976 | Tombu | 160/395 |
| 3,982,306 | 9/1976 | Curry | 24/243 K |
| 3,987,835 | 10/1976 | Bloomfield | 160/392 |

*Primary Examiner*—William H. Schultz
*Attorney, Agent, or Firm*—Benjamin G. Weil

[57] ABSTRACT

The attachment device is made of two piece separable construction for use in securing flexible films and fabrics, hereafter referred to as material. One element has two longitudinal grooves facing in opposite directions, one groove being larger than the other groove. The other element has two longitudinal beads that positively interlock with the grooves of the first element when the two elements are pushed together by one of said beads and the larger groove acting as a pivot and the other bead and smaller groove being engageable by relative rotational movement of said elements about said pivot. Flexing of one or both elements allows for engagement of the shallower groove and complementary bead. The said interlocking action of the two elements is utilized to capture and secure material placed between the two elements. The shallower groove and complementary bead are disengageable by relative rotational movement of the two elements about said pivot when the two elements are pulled apart.

5 Claims, 11 Drawing Figures

ATTACHMENT DEVICE FOR FLEXIBLE FILMS AND FABRICS

BACKGROUND OF THE INVENTION

Films and fabrics are now widely used for drapings, covers, liners, etc. For these applications the materials are most often secured along their edges by the use of various fasteners, e.g., wood strips with tacks, flexible tapes with staples or tacks, grommets with ties, weights, and straps. Most often these fasteners are cumbersome to apply, unreliable and non-reusable. In many applications, a reusable device is desired which holds the material securely but still allows ease of application and removal.

SUMMARY OF THE INVENTION

The present invention provides an improved simple and economical attachment device which positively secures the edge of a material.

Another object of the invention is to provide an improved attachment device which may be reused to secure the edge of a material.

Another object of the invention is to provide an improved attachment device which may be used to secure the edge of one or multiple sheets of material.

Another object of the invention is to provide an improved attachment device which may be easily applied and removed.

Another object of the invention is to provide an improved attachment device which will not cut or tear the material.

The invention is made of two piece separable construction wherein one of the elements may be rigidly secured to a base or frame by any suitable fastening means. The other element may embody a tab or other suitable means for aid in removal of said other element; however, the loose edge of the secured material may be lifted to remove said other element.

These and other objects are accomplished by the improvements comprising the present invention, an attachment device which is shown by way of example in the accompanying drawings and described in detail in the following specification. Various modifications and changes in details of construction are comprehended within the scope of the appended claims.

The flexible material has been removed for clarity in FIGS. 7, 8, 9, and 10.

Figure 7:
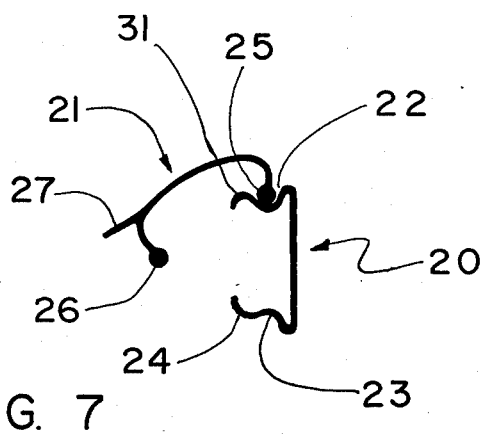

FIG. 7 is an end view of attachment device showing one bead of beaded element engaged in deeper groove of grooved element with the two elements in a partially spread-apart position.

Figure 8:
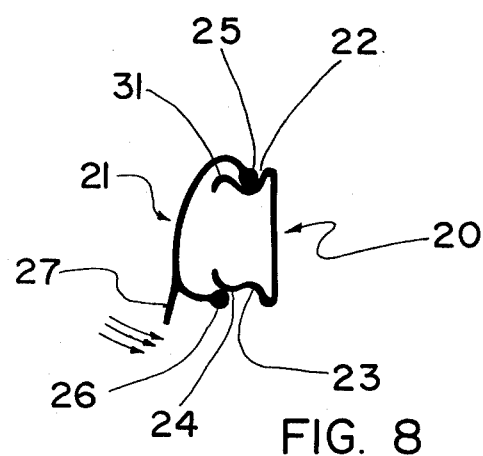

FIG. 8 is a similar view showing the two elements in an interference position.

Figure 9:
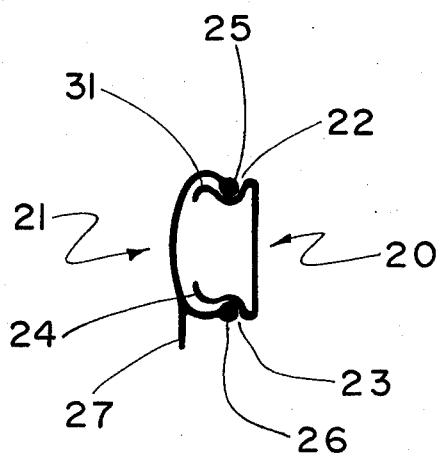

FIG. 9 is a similar view showing the two elements in a fully closed or interlocked position.

Figure 10:
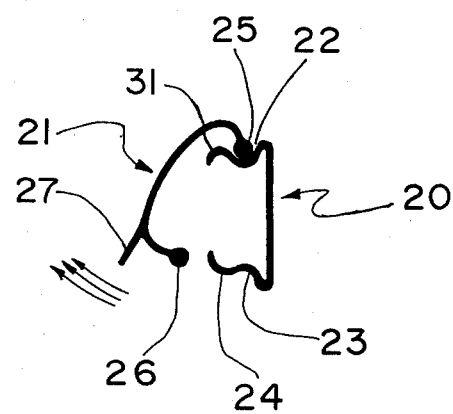

FIG. 10 is a similar view showing the two elements in an unlocked or released position.

Figure 11:
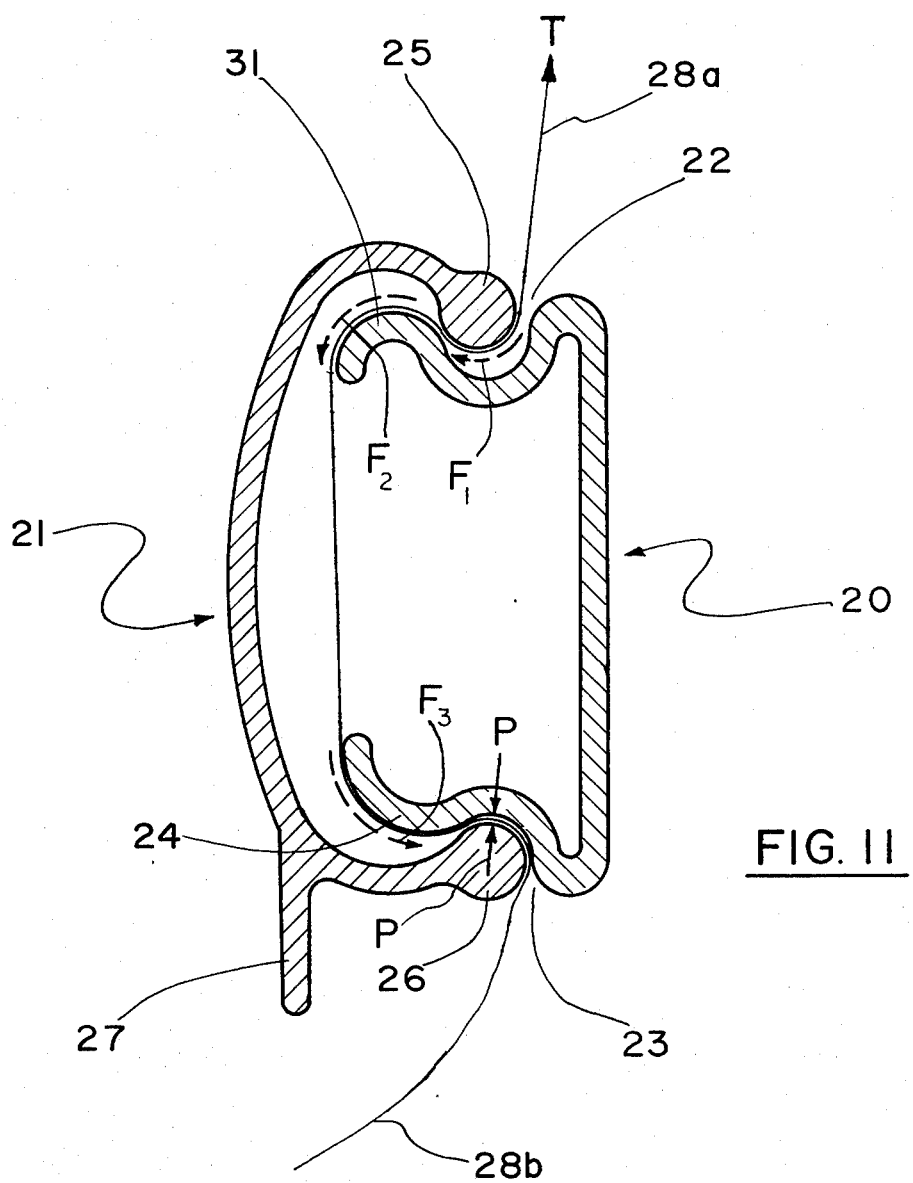

FIG. 11 is a similar view illustrating the securing mechanism of the invention.

DETAILED DESCRIPTION OF DRAWINGS

Figure 1:
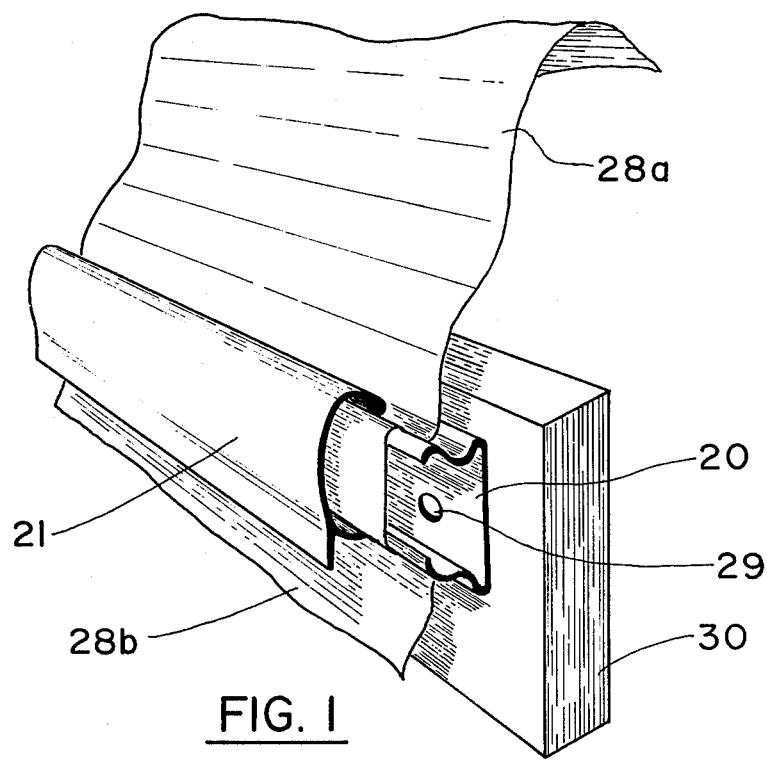
FIG. 1 illustrates a perspective view of an attachment device made in accordance with the invention.

Referring to FIG. 1, the attachment device is constructed of two complementary male and female elements numbered 20 and 21 respectively which are shown engaged with each other in the closed or interlocked position, the female element 21 being superior to the male element 20, holding the edge 28b of a material 28a having an inner and an outer surface as shown in FIG. 11, the inner surface being adjacent to female member 20. Male element 20 is shown mounted to a base 30 by way of mounting hole 29; however, either element 20 or 21 may be mounted to a frame or base 30 by any suitable means.

Figure 2:
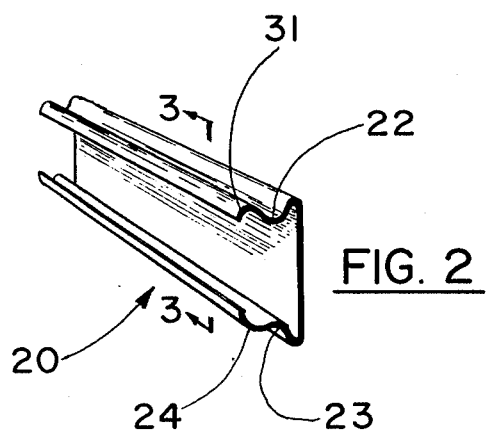
FIG. 2 illustrates a perspective view of grooved element.
Figure 3:
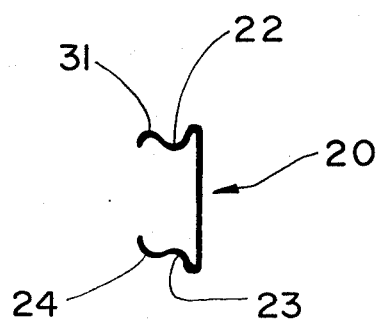
FIG. 3 illustrates a cross-sectional view taken on line 3—3 of FIG. 2.

The grooved male element 20 as shown in FIG. 2 and FIG. 3 embodies two longitudinal concave grooves on its outwardly extending sides, a larger groove 22 and a smaller groove 23, that open outwardly in opposite directions. Element 20 also contains two rounded nibs, nib 24 adjacent to groove 23 and nib 31 adjacent to groove 22.

Figure 4:
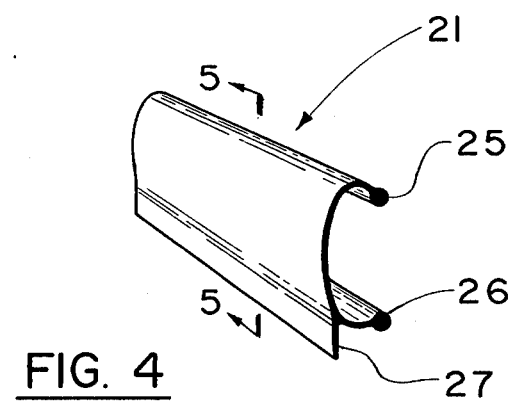
FIG. 4 illustrates a perspective view of beaded element.
Figure 5:
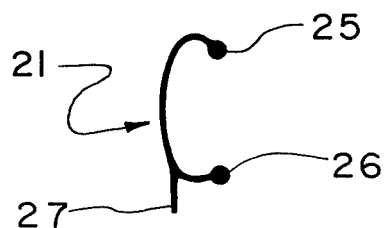
FIG. 5 illustrates a cross-sectional view taken on line 5—5 of FIG. 4.

The beaded female element 21 is even and regular in cross section as shown in FIG. 4 and FIG. 5 and embodies two symmetrical convex longitudinal beads 25 and 26 on its outwardly extending sides that face inwardly in opposite directions these beads 25 and 26 having a cross-section complementary to smaller groove 23. Element 21 is shown also containing a removal tab 27 that is offered as an aid in removing or detaching element 21 from element 20; however, tab 27 is not essential for operation of the invention.

Figure 6:
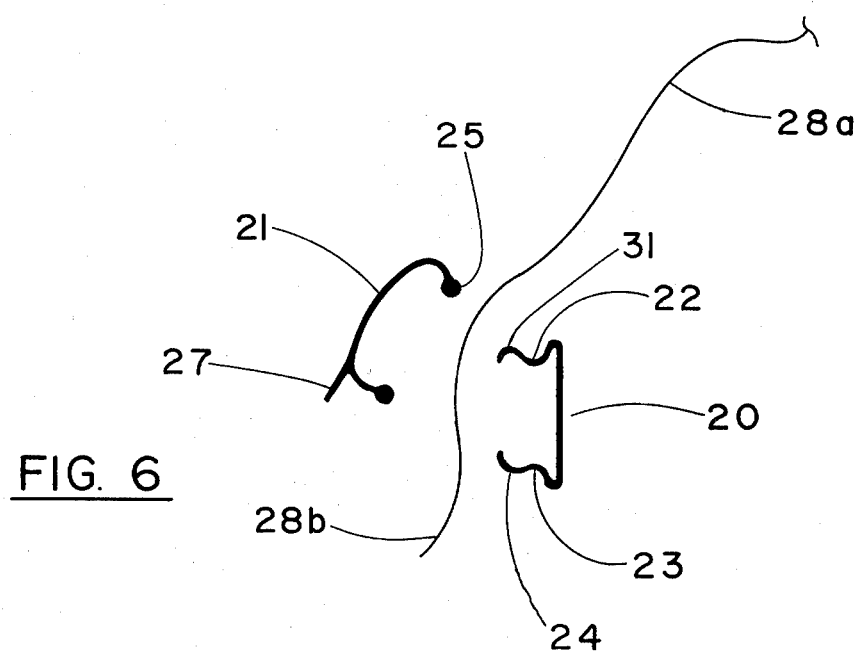
FIG. 6 is an end view of attachment device showing both beaded and grooved elements with a flexible material in ready position for attachment.

In FIG. 6, the two elements 20 and 21 are placed in a facing relationship with edge 28b of material 28a in a ready position for attachment. Larger longitudinal groove 22 of element 20 must always face the body of the material 28a; the reasons for this requirement will be made apparent in description of FIG. 11.

Referring to FIGS. 7 to 9, in order to secure the edge 28b of said material 28a, bead 25 is seated into larger groove 22 with said material edge 28b disposed between said bead 25 and said groove 22. Elements 20 and 21 are rotated about pivot, comprised of bead 25 and groove 22, to a slight interference position where bead 26 abuts nib 24. As elements 20 and 21 are pushed further together, flexing of one or both said elements 20 and 21 allows bead 26 to pass over nib 24, seat, and interlock into groove 23.

In FIG. 10, the edge 28b of material 28a is released from the grasp of the invention by disengaging the two elements 20 and 21, said disengagement being accomplished by relative rotational movement of elements 20 and 21 about said pivot (bead 25 and groove 22).

Referring to FIG. 11, the invention is shown grasping the edge 28b of a material 28a. A tensional force T applied to the material body 28a tends to lift and disengage longitudinal bead 25 from longitudinal groove 22, which groove 22 is larger than bead 25, thereby permitting the female element 21 to be rotationally displaced about a pivot composed of bead 26 and groove 23 by a tensional load applied to the material body 28a. However, said rotational disengagement is prevented by a large interference between bead 25 and nib 31 provided by larger groove 22 thereby clamping material 28a between bead 25 and groove 22. Additive frictional forces, $F_1$, $F_2$, and $F_3$ applied to material edge 28b by bead 25, nib 31, and nib 24 respectively in response to rotational displacement in conjunction with a pinching force P applied to the material edge 28b by bead 26 and groove 23 prevent slippage of material edge 28b from between elements 20 and 21 combine to securely clamp material 28a between male element 20 and female element 21.

We claim:

1. In a two piece separable device for securely holding flexible material having an inner and an outer surface, the combination comprising complementary inferior male means beneath said inner surface and superior female means above said outer surface which releasably mate together by flex action to capture said material between said means, said male means being provided with an arcuate concave groove opening outward in opposite directions on each of its two outwardly extending sides, one of said grooves being larger than the other with said larger groove being disposed towards the body of said material, and said female means being substantially even and regular in cross-section and having a symmetrical arcuate bead on each edge of its two dependent sides, said beads having a cross-section complementary to the smaller of said concave grooves and said larger groove having sufficient larger size relative to said engaging bead to permit said female means to be rotationally displaced by a tension load placed on said flexible material while being sufficiently small in size to prevent rotational disengagement of said bead due to said tension load, thereby clamping said material between said female and said male means without permitting rotational disengagement of said bead due to said tension load, said grooves and said beads being arranged to engage each other so as to interlock and thereby securely clamp said material between said male and said female means in response to said rotational displacement.

2. The apparatus of claim 1 wherein said female means includes removal tab means extending from the outer surface of said female means.

3. The apparatus of claim 1 wherein the cross-section of said female means is such as to permit said means to flex and releasably engage said male means.

4. The apparatus of claim 1 wherein the cross-section of said male means is such as to permit said means to flex and releasably engage said female means.

5. The apparatus of claim 1 wherein both said male means and said female means flex to engage each other.

* * * * *